US006852402B2

United States Patent
Kirjavainen et al.

(10) Patent No.: US 6,852,402 B2
(45) Date of Patent: Feb. 8, 2005

(54) DIELECTRIC CELLULAR ELECTRET FILM AND PROCEDURE FOR ITS MANUFACTURE

(75) Inventors: Kari Kirjavainen, Espoo (FI); Keijo Korhonen, Kuopio (FI); Jyrki Kroger, Kuopio (FI); Lasse Raisanen, Oulu (FI)

(73) Assignee: Emfitech Oy, Vaajakoski (FI)

( * ) Notice: Subject to any disclaimer, the term of this patent is extended or adjusted under 35 U.S.C. 154(b) by 47 days.

(21) Appl. No.: 09/759,938

(22) Filed: Jan. 11, 2001

(65) Prior Publication Data

US 2001/0024712 A1 Sep. 27, 2001

Related U.S. Application Data

(63) Continuation-in-part of application No. 08/776,868, filed as application No. PCT/FI95/00426 on Aug. 11, 1995, now abandoned.

(30) Foreign Application Priority Data

Aug. 12, 1994 (FI) .................................................. 943721

(51) Int. Cl.[7] .......................... B32B 3/26; G11C 13/02; G10H 3/14
(52) U.S. Cl. ................................. 428/305.5; 428/314.4; 428/317.1; 428/317.3; 428/343; 307/400; 84/733; 84/723
(58) Field of Search ........................... 428/317.1, 317.3, 428/343, 314.4, 305.5; 307/400; 84/733, 723

(56) References Cited

U.S. PATENT DOCUMENTS

| 4,239,973 A | | 12/1980 | Kolbe et al. |
| 4,654,546 A | * | 3/1987 | Kirjavainen ................. 29/594 |
| 4,741,119 A | | 5/1988 | Baryla |
| 5,010,671 A | | 4/1991 | Stonehouse |
| 5,051,586 A | | 9/1991 | Sabreen |
| 5,178,942 A | | 1/1993 | Frognet et al. |
| 5,258,214 A | | 11/1993 | Cooledge et al. |

FOREIGN PATENT DOCUMENTS

| DE | 29 47 873 | 7/1980 |
| WO | 94/08779 | 4/1994 |

* cited by examiner

Primary Examiner—Terrel Morris
Assistant Examiner—Hai Vo
(74) Attorney, Agent, or Firm—Katten Muchin Zavis Rosenman

(57) ABSTRACT

Film of dielectric material, which film contains gas bubbles preferably of a flat shape. To achieve improved electrical properties, the film is given a large internal unipolar charge, which is created by charging the film by means of an electric field intensive enough to produce partial discharges in the gas bubbles and to cause the charges to move into the dielectric material of the film.

24 Claims, 2 Drawing Sheets

DIELECTRIC CELLULAR ELECTRET FILM AND PROCEDURE FOR ITS MANUFACTURE

CROSS-REFERENCE TO RELATED APPLICATION

This is a continuation-in-part of application Ser. No. 08/776,868 filed on May 6, 1997, now abandoned, which was the National Stage of International Application number PCT/FI 95/00426, filed on Aug. 11, 1995, which was published in English under PCT Article 21(2).

FIELD OF THE INVENTION

The present invention relates to a dielectric cellular electret film containing flat gas bubbles and to a procedure for its manufacture. The invention also relates to a electromechanical transducer elements used for example in pressure, force, acceleration or vibration transducers having one or several dielectric cellular electret film

BACKGROUND OF THE INVENTION

It is known that charges are formed on the surface of dielectric films when the films are rubbed or reeled or when the films are manufactured by previously known continuous manufacturing methods. The electric charges thus produced may generate electrostatic forces and the films may e.g. adhere to different surfaces. However, such electrostatic forces of attraction are very weak and the charges can easily disappear e.g. due to humidity, so the action of these forces may be of a very short duration. When this is the case, the films will not set straight on a surface and they are easily detached e.g. by air current.

Previously known are also electrets produced from solid material in which charges are generated in the film surface structure by subjecting it to a DC corona treatment. Such electret films can be utilized for example in various transducer and sensor applications, such as e.g. the electret microphone.

Producing a powerful charge penetrating deep into a solid film material is very difficult because it is not possible to increase the surface potential of such film material to a sufficiently high level during the corona treatment (charging) because of the leakage current flowing through the film. A leakage current flows because in solid material the resistance of the material is reduced as a function of voltage.

A further known method is to manufacture e.g. from polypropylene a bubble film which contains small, preferably flat gas bubbles placed in an overlapping arrangement inside the film. Due to the whiteness of the film resulting from the bubble structure, such film is an excellent material for printing. This kind of white film is generally used e.g. as packaging material.

In a film containing flat gas bubbles, resistivity is not reduced in the gas bubbles and the leakage current is not increased with voltage. Therefore, it is possible during charging to achieve a high electric field, e.g. in the range 100–200 MV/m, which in turn produces partial discharges in the bubbles contained in the film.

SUMMARY OF THE INVENTION

It is an object of the present invention to achieve improved electrical properties in dielectric cellular electret films, where the film has a large unipolar charge created inside the film.

It is a further object of the present invention to achieve a transducer element to convert mechanical stress, such as force, pressure or mechanical vibrations, into electrical signals.

It is another object of the present invention to achieve a self-adhesive film made self-adhesive by an electrostatic force, a film whose strong adhesion is based on a large unipolar charge created inside the film.

It is a further object of the present invention to achieve a procedure for manufacturing a dielectric cellular electret film.

The invention is characterised in that the dielectric cellular electret film having flat gas bubbles contains partial discharges inside the film produced in the gas bubbles to achieve improved electrical properties.

The invention is further characterised in that the film has partial discharges produced in the gas bubbles and the charges are caused to move into the dielectric material of the film as a result of that the film is provided with a large internal unipolar charge created by charging the film by means of an electric DC field intensive enough to produce partial discharges in the gas blisters and to cause the charges to move into the dielectric material of the film.

With the film of the invention, very good electric and acoustic properties, such as sensitivity and adhesion are achieved. Moreover, the film of the invention retains its charge for a very long time, typically several years.

In addition, because of the charge inside the film, an electrostatic force is active on both sides of the film, which means that films will stick together very firmly. This makes it possible to place several films, typically 15–30 pcs and even as many as 50 pcs, on top of each other like the leaves of a so-called flap board. It is also possible to attach other materials, such as paper, onto the film.

The most significant advantage provided by this type of self-adhesive film is that no separate adhesive substances, such as glue, or fixing tools are needed to make it adhere to a surface.

The film of the invention sets straight and clean onto a surface. The film can resist e.g. air currents, humidity and heat without being detached from the surface. In addition, it adheres well even on a rough surface.

DETAILED DESCRIPTION OF THE INVENTION

Figure 1:
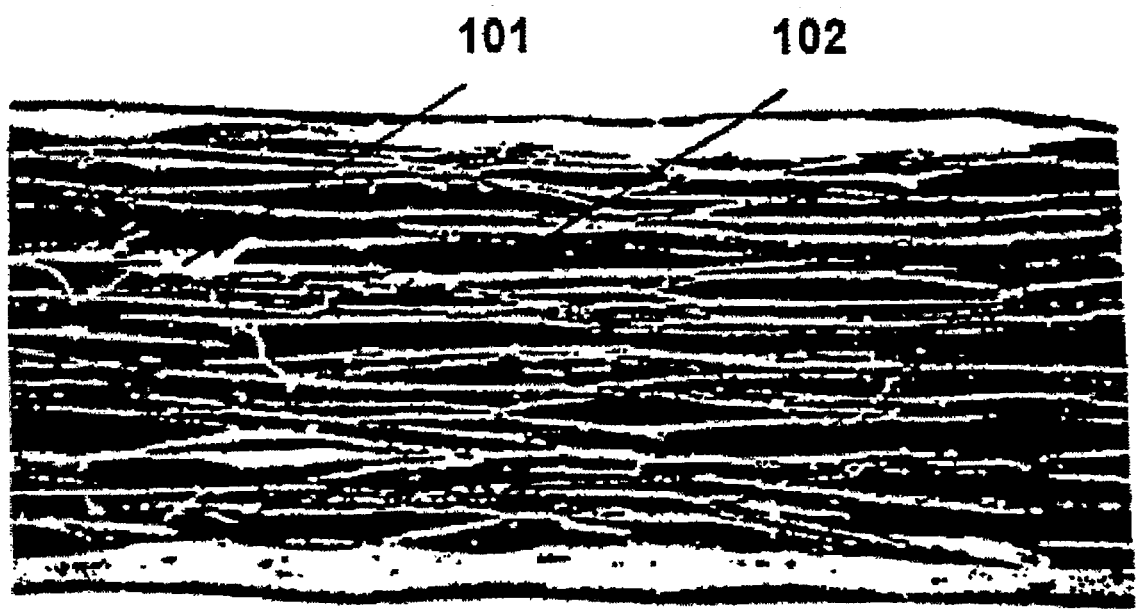
FIG. 1 presents a cross-section of a swelled dielectric cellular electret film.

To produce a cellular dielectric electret film as provided by the invention, a bubble film 101 made of a plastic material, e.g. polypropylene, of a thickness of a few tens of :m, e.g. 50 :m, is charged by means of a very intensive electric field (e.g. in the range of 100–200 MV/m). During charging, partial discharges occur in the flat lens-like, shredded or cavitated gas bubbles 102 which also may be called voids or cells in the film, and the charges are injected into the plastic material of the film. Due to the large resistivity of the bubble structure and the film material, the charges are well retained within the film. As a result, a film is obtained which has a high net charge and whose strong adhesion is based on a large unipolar charge inside the film.

Because of the powerful net charge, such a film is especially applicable as a self-adhesive film which can be used e.g. as a medium of visual information e.g. by printing the information directly on the film. As the charge inside the film generates an adhesion force on both sides of the film, information printed on paper or other light material can be attached to the film. It is also possible to pile films on top of each other e.g. on a wall to form a so-called flap board.

One can also cut holes or patterns of arbitrary shape in the film, so it can be used e.g. as an anti-glare barrier in automobiles or for various decorative purposes.

Furthermore, it is possible to create charges of opposite sign inside the film so that certain areas of the film contain a positive charge and certain other areas a negative charge, e.g. so that positively and negatively charged strips or areas of any shape placed side by side are formed in the film. When the positive and negative charges are equal, the net charge of the film is zero and the film can also be used between metal sheets without generating in the metal sheets voltage differences according to the capacitance law $$\Delta U = \frac{Q}{\Delta WC} \quad (1)$$

where $\Delta U$ is the voltage, Q is the charge of the film and $\Delta C$ is the change in capacitance occurring when the sheets are being detached or piled up. The change in capacitance may be of the order of 1 $\mu F/m^2$ and, without the use of strips, the voltage differences thus produced may be several kV and therefore even dangerous to life. One of the applications made possible by such a film is its use a self-adhesive protective film on steel and sheet metal plates.

To improve its adhesion and printability, the bubble film may also be advantageously subjected to an AC corona treatment. The corona treatment is performed before charging. Possible uses of the film may be further increased by providing one side of the film with a coat of slightly sticker-like material, which allows the adhesion of the film to be adjusted both via AC corona treatment and by adjusting the intensity of the charging process described above.

Further, the amount of net charge formed inside the film can be adjusted by doping the film with charge binding additives, such as ferrochloride, which generally contain impurities which act as charge centres.

The film can also used as a transducer element to convert mechanical load, such as force, pressure or mechanical vibrations, into electrical signals.

The film has film layer foamed to be of full-cell type and it has been oriented by stretching it in two directions. It may be coated at least in part on one side or on both sides with an electrically conductive layer.

The film can be pressure inflated from a prefoamed plastic film, so that the film becomes a strongly foamed film product, involving a high foaming degree and allowing the thickness of the product to be increased without increasing the amount of plastic material. The term "swelled dielectric electret bubble film" is used herein to refer to a foamed film-like plastic product having a permanent electric charge injected into material.

Figure 2:
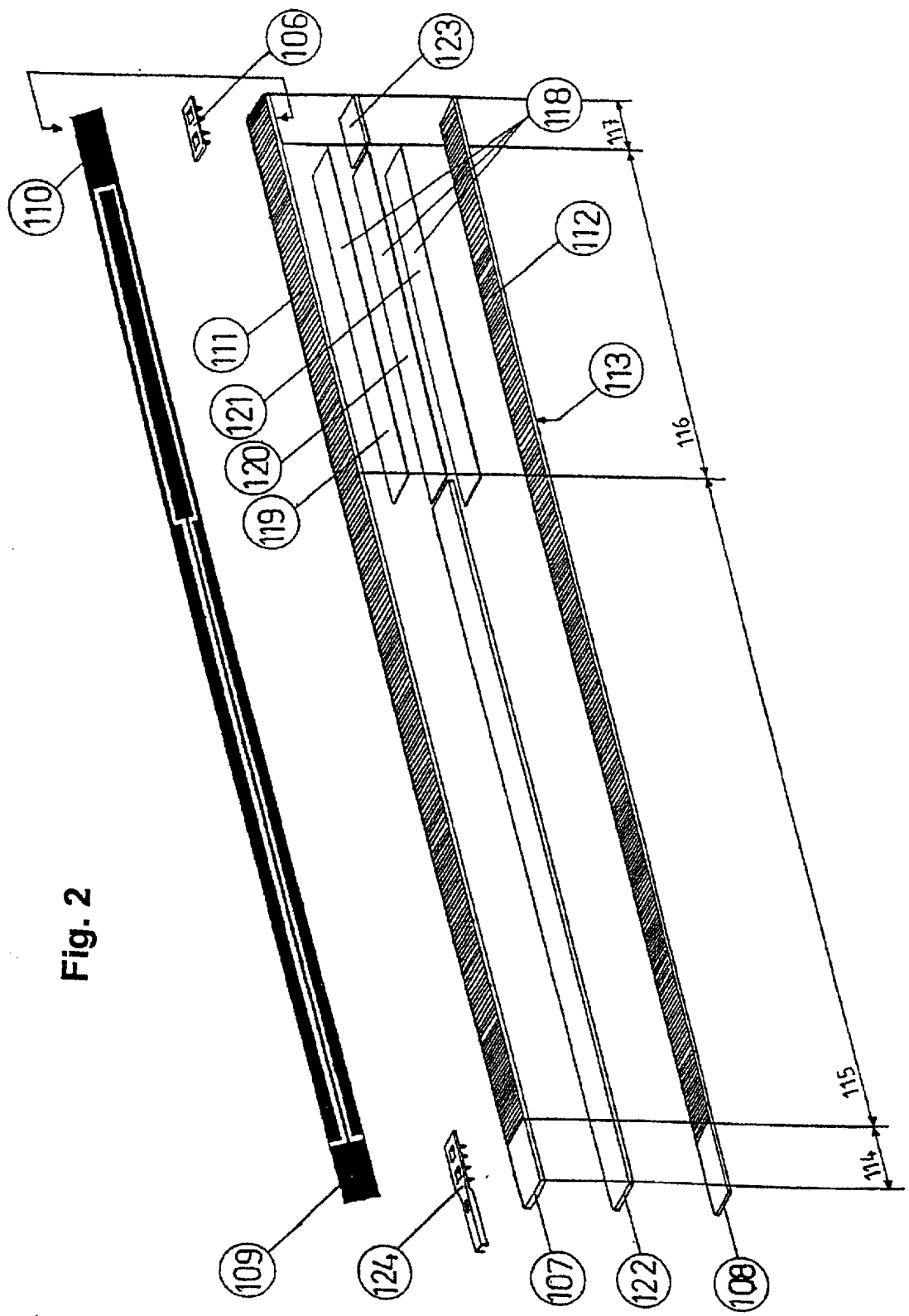
FIG. 2 presents an exploded perspective view illustrating the different components that belong to the transducer according to the invention.

FIG. 2 presents a transducer element for converting mechanical stress, such as mechanical vibrations, into electric signals. The element comprises a transducer part 116, a conductor part 115, a connector part 114 and an end part 117.

In the embodiment of FIG. 2 the transducer of the invention is composed of sheets 107 and 108 of dielectric film, which may be made e.g. of 0.1 mm thick polyester. On the underside of sheet 107, a signal electrode 109 is printed by the serigraphic technique using e.g. silver or graphite. Printed around the signal electrode 109 is a ground electrode 110, which reduces electromagnetic interference noice in the signal. It is noted, however, that this ground electrode 110 is not essential to the structure. Printed by the serigraphic technique on the top surface of film sheet 107 is a ground electrode 111, which may also consist of aluminium foil or other electrically conductive foil suited for the purpose. Seri-printed on the top surface of sheet 108 is a ground electrode 112 and on the bottom surface also a ground electrode 113. It should be noted that this ground electrode 113 is not essential for the structure in this and other embodiments of the invention, where the transducer is not a differential transducer. Sheet 108 may also consist of e.g. thin aluminium or brass foil or other electrically conductive foil suited for the purpose. It is noted that the ground electrodes 110, 111, 112, 113 are shorter at the end 114 pointing towards the preamplifier than the signal electrode 109, whereas at the other end 117 the ground electrodes are somewhat longer than the signal electrode. Instead of being serigraphically printed, the electrodes may also be evaporated e.g. from aluminium onto dielectric films using a mask. Between the sheets 107, 108 there is an element 118. This element 118 is composed of three preferably swelled dielectric electret bubble films 119, 120, 121. Injected onto the underside of the topmost film 119 is a negative electric charge. Injected onto the top side of the intermediate film 120 is also a negative electric charge, while a positive electric charge is injected onto its underside. Injected onto the top side of the bottommost film 121 is a positive electric charge. After being charged, the films have been glued together. The bottommost films 121 bottom side may also be provided with a metallic electrically conductive surface, e.g. evaporated aluminium, which is to be noted is not necessary. This electrically conductive surface is possible to have also on topside as well as on one or both sides of films 119(on topside when ground electrode 110 is not printed) and 120 but it is not recommended. With the charging procedure described, a maximal electric charge density is achieved. From the point of view of operation, it is sufficient to have only the surfaces of the intermediate film 120 charged. Such an element responds only to the pressure generated by the vibration of the strings, not to bending at all.

The element may also consist of two dielectric electret bubble films, in which element 118 unlike charges of the films 119, 121 are placed opposite to each other. Such a structure mainly responds to pressure only and very slightly to bending and is thus applicable for converting the vibrations of the strings 103 into electric signals. By placing the films with like charges opposite to each other, an element mainly responsive to bending is achieved. For operation, it is sufficient that element 118 be composed of only one swelled dielectric electret bubble film.

Between sheets 107 and 108 there is also a dielectric film 122, which may be made e.g. of polyester, preferably of the same thickness as the film element 118. This insulation prevents a short circuit between the signal electrode 109 and the ground electrode 112. Instead of using a dielectric film 122, it is possible to provide the bottom surface of film 107 at the area 115 or the top surface of film 108 at the area 115 with dielectric insulation serigraphically printed over the electrode(s) on the surface to prevent short circuit. Between the film sheets 107, 108 there is also a dielectric film 123 on the other side of the element 118 at the area 117, preferably of the same thickness as film 122. Another possibility is to extend the element 118 consisting of dielectric electret bubble films to the end of area 117, in which case film 123 is not needed. Similarly, it is possible to extend the element 118 to the end of area 114 as well, in which case film 122 is not needed. At one end 117 of the transducer is a metallic connector 106 mechanically pressed through sheets 107, 123, 108, shorting the ground electrodes 111, 110, 112, 113. At the other end 114 is a metallic connector 124 mechanically pressed through sheets 107, 122, 108 to connect the signal electrode 109 to a signal processing device. The ground electrodes, which are all thus disposed on the outer surfaces of film sheets 107, 108, are grounded e.g. by pressing them between the halves of the casing of the signal processing device. It is recommendable to use a soft, electrically conductive material in this area between the halves of the casing. The grounding can also be implemented by pressing one of the ground electrodes 111, 113 against the circuit board of the signal processing device at a point reserved for it, at which point it is also recommendable to use electrically conductive rubber as mentioned above.

It is obvious to a person skilled in the art that different embodiments of the invention are not restricted to the example described above but that they may instead be varied within the scope of the claims presented below.

What is claimed is:

1. A dielectric cellular electret film, said cellular film containing flat gas bubbles, wherein the film contains partial discharges inside the film produced in the gas bubbles to achieve improved electrical properties, the film not being coated with an electrically conductive layer.

2. The dielectric cellular electret film according to claim 1, wherein the film has partial discharges produced in the gas bubbles and the charges are caused to move into the dielectric material of the film as a result of the film being provided with a large internal unipolar charge created by charging the film by means of an electric DC field intensive enough to produce partial discharges in the gas bubbles and to cause the charges to move into the dielectric material of the film.

3. The dielectric cellular electret film according to claim 1, wherein the film is a swelled dielectric cellular electret film.

4. The dielectric cellular electret film according to claim 1, wherein the film has at least one film layer foamed to be of full-cell type, and wherein the film has been oriented by stretching it in two directions.

5. A dielectric cellular electret film, said cellular film containing flat gas bubbles, wherein the film is a swelled dielectric cellular electret film; wherein the film has at least one film layer foamed to be of full-cell type, wherein the film has been oriented by stretching it in two directions, and wherein the film contains partial discharges inside the film produced in the gas bubbles to achieve improved electrical properties, the film not being coated with an electrically conductive layer.

6. A transducer element having one or several swelled dielectric cellular electret films, said cellular films containing flat gas bubbles, wherein the film contains partial discharges inside the film produced in the gas bubbles to achieve improved electrical properties, the film not being coated with an electrically conductive layer.

7. The transducer element according to claim 6, wherein the film has partial discharges produced in the gas bubbles and the charges are caused to move into the dielectric material of the film as a result of the film being provided with a large internal unipolar charge created by charging the film by means of an electric DC field intensive enough to produce partial discharges in the gas bubbles and to cause the charges to move into the dielectric material of the film.

8. The transducer element according to claim 6, comprising at least one cellular electret film, at least one signal electrode and at least two ground electrodes, wherein the transducer element is a electret film, containing a permanent electric charge, the film being a cell-type electret film, and the transducer part has a laminated structure, where at least the signal electrode is disposed on the surface of the electret film or another dielectric film.

9. The transducer element according to claim 8, wherein the transducer has a unitary laminated structure, where the signal and ground electrodes have been disposed on the surface of the dielectric films and continue unitary from the transducer part as a connection element part, whereby the electrodes extend from the transducer part as connection element part for connecting the transducer to a signal processing device.

10. The transducer element according to claim 8, wherein the element has at least two transducer film elements, at least one of the elements having different electric charges on their surfaces.

11. A self-adhesive film self-adhesive by virtue of an electrostatic force comprising a dielectric cellular electret film, said cellular films containing flat gas bubbles, wherein the film contains partial discharges inside the film produced in the gas bubbles to achieve improved adhesive properties, the film not being coated with an electrically conductive layer.

12. The self-adhesive film according to claim 11, wherein the film has partial discharges produced in the gas bubbles and the charges are caused to move into the dielectric material of the film as a result of the film being provided with a large internal unipolar charge created by charging the film by means of an electric DC field intensive enough to produce partial discharges in the gas bubbles and to cause the charges to move into the dielectric material of the film.

13. A film of dielectric material, self-adhesive by virtue of an electrostatic force, which film contains gas bubbles preferably of a flat shape, wherein, to achieve an adhesive quality of the film, the film is given a large internal unipolar charge, which is created by charging the film by means of an electric field intensive enough to produce partial discharges in the gas bubbles and to cause the charges to move into the dielectric material of the film, the film not being coated with an electrically conductive layer.

14. The film as defined in claim 13, wherein the film is coated with a slightly adhesive layer.

15. The film as defined in claim 13, wherein, to adjust the adhesion of the film, one or both of its surfaces are subjected to an AC corona treatment before charging.

16. The film as defined in claim 13, wherein, to increase the net charge created inside the film, the film is doped with charge binding additives.

17. The film as defined in claim 13, wherein certain areas of the film contain a positive charge while the other areas have a negative charge.

18. A self-adhesive cell type dielectric film, self-adhesive by virtue of an electrostatic force, said cell type film lying flat on a flat surface without manipulation, said cell type film containing flat gas blisters, and said film containing partial discharges inside the film produced in the gas blisters to achieve an adhesive quality of the film, the film not being coated with an electrically conductive layer.

19. The self-adhesive cell type dielectric film according to claim 18, wherein said partial discharges move into the dielectric material of the film, the film being provided with a large internal unipolar charge created by charging the film by means of an electric DC field intensive enough to produce partial discharges in the gas blisters and to cause the charges to move into the dielectric material of the film.

20. The film as defined in claim 19, wherein the charge binding additive is ferrochloride.

21. The film as defined in claim 18, wherein to adjust the adhesion of the film, one or both of its surfaces are subjected to an AC corona treatment before charging.

22. The film as defined in claim 18, wherein the film is coated with a adhesive sticky layer.

23. The film as defined in claim 18, wherein to increase a network charge created inside the film, the film is doped with charge binding additives.

24. The film as defined in claim 18, wherein certain areas of the film contain a positive charge while the other areas have a negative charge.

* * * * *